United States Patent
Tang et al.

(10) Patent No.: US 11,889,132 B2
(45) Date of Patent: Jan. 30, 2024

(54) METHOD AND APPARATUS FOR IMPLEMENTING MULTI-PERSON VIDEO LIVE-STREAMING SERVICE, AND COMPUTER DEVICE

(71) Applicant: SHANGHAI HODE INFORMATION TECHNOLOGY CO., LTD., Shanghai (CN)

(72) Inventors: Zixin Tang, Shanghai (CN); Dewei Xue, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/783,630

(22) PCT Filed: Aug. 18, 2020

(86) PCT No.: PCT/CN2020/109869
§ 371 (c)(1),
(2) Date: Jun. 8, 2022

(87) PCT Pub. No.: WO2021/114708
PCT Pub. Date: Jun. 17, 2021

(65) Prior Publication Data
US 2023/0011255 A1    Jan. 12, 2023

(30) Foreign Application Priority Data
Dec. 9, 2019    (CN) .......................... 201911251118.0

(51) Int. Cl.
*H04N 21/2365* (2011.01)
*H04N 21/2187* (2011.01)
(Continued)

(52) U.S. Cl.
CPC ..... *H04N 21/2365* (2013.01); *H04N 21/2187* (2013.01); *H04N 21/23418* (2013.01); *H04N 21/2668* (2013.01)

(58) Field of Classification Search
CPC ........... H04N 21/2365; H04N 21/2187; H04N 21/23418; H04N 21/2668
See application file for complete search history.

(56) References Cited

U.S. PATENT DOCUMENTS

| 2011/0154417 | A1* | 6/2011 | Civanlar | H04N 7/15 725/105 |
| 2011/0306325 | A1  | 12/2011 | Gutta et al. | |
| 2016/0294890 | A1* | 10/2016 | Miller | H04L 51/56 |

FOREIGN PATENT DOCUMENTS

| CN | 105491393 A | 4/2016 |
| CN | 105791958 A | 7/2016 |
(Continued)

OTHER PUBLICATIONS

International Patent Application No. PCT/CN2020/109869; Int'l Search Report; dated Oct. 28, 2020; 3 pages.

*Primary Examiner* — Nnenna N Ekpo
(74) *Attorney, Agent, or Firm* — BakerHostetler

(57) ABSTRACT

The present application discloses techniques of implementing a multi-person video live streaming service. The techniques comprise obtaining a first video and a second video of a live streamer, and obtaining a third video of any other live streaming member than the live streamer in a live streaming group; stitching the first video, the second video, and the third video of the any other live streaming member, for obtaining a multi-person live video stream; and sending the multi-person live video stream to respective live streaming clients associated with members in the live streaming group for the members to watch. The present application can (Continued)

increase the modes of interaction of live streaming members, thereby improving the user experience.

18 Claims, 7 Drawing Sheets

(51) Int. Cl.
  *H04N 21/234* (2011.01)
  *H04N 21/2668* (2011.01)

(56) References Cited

FOREIGN PATENT DOCUMENTS

| | | |
|---|---|---|
| CN | 106162221 A | 11/2016 |
| CN | 106341695 A | 1/2017 |
| CN | 106954100 A | 7/2017 |
| CN | 107105315 A | 8/2017 |
| CN | 108235044 A | 6/2018 |
| CN | 108259989 A | 7/2018 |
| WO | WO 2019/118890 A1 | 6/2019 |

\* cited by examiner

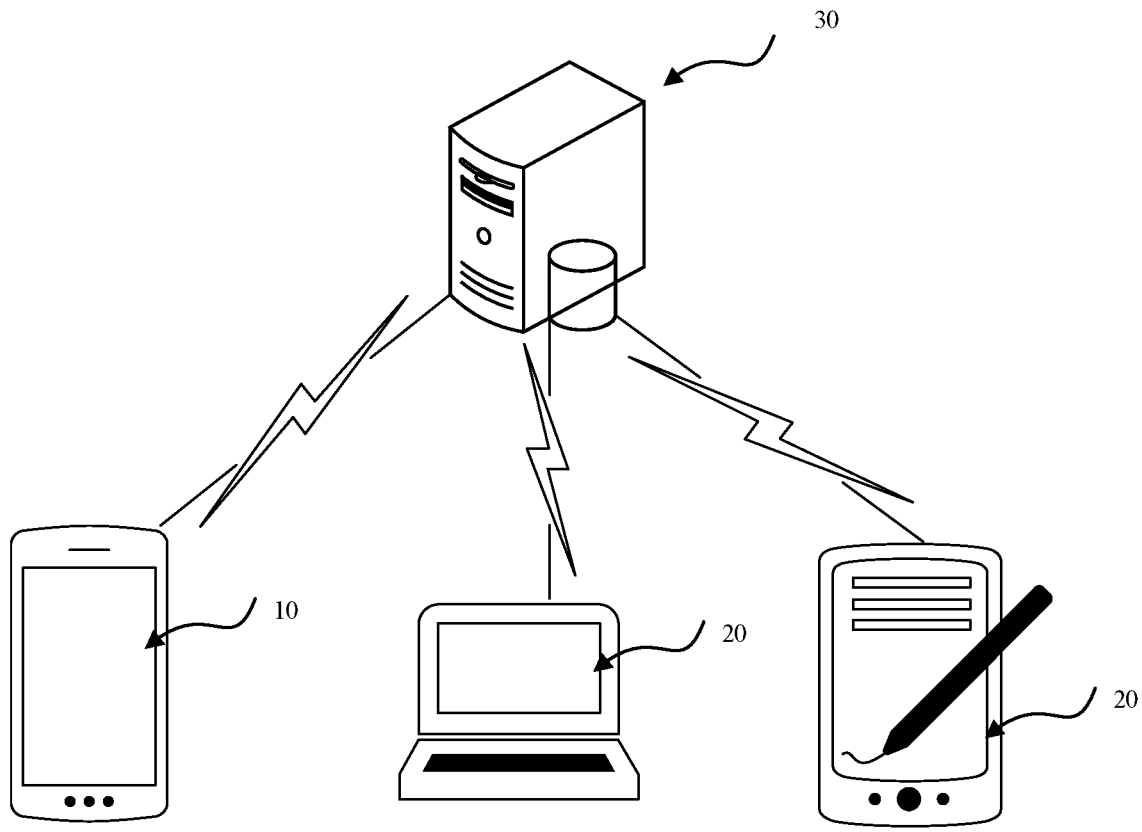

FIG. 1

Obtain a first video and a second video of a live streamer, and obtain a third video of other live streaming members than the live streamer in a live streaming group, where the first video includes a real-time image acquired by a first camera apparatus of the live streamer, the second video includes a video that the live streamer is watching, and the third video includes real-time images acquired by second camera apparatuses of the other live streaming members — S20

Stitch the first video, the second video, and the third video of the other live streaming members, for obtaining a multi-person live video stream, where each frame of the multi-person live video stream includes a frame of the first video, a frame of the second video, and a frame of the third video of the other live streaming members — S21

Send the multi-person live video stream to respective live streaming clients of the live streaming members for the live streaming members to watch — S22

FIG. 2

FIG. 5

Perform expression recognition on a first video frame to be synthesized of the first video and a third video frame to be synthesized of the third video of the other live streaming members — S40

Add, when a preset expression is recognized, a preset sticker special effect to a video frame to be synthesized with the preset expression recognized, where no sticker special effect is added to a video frame to be synthesized with no preset expression recognized — S41

Stitch the second video frame to be synthesized of the second video, the video frame to be synthesized having the sticker special effect, and the video frame to be synthesized having no sticker special effect, for obtaining a frame of the multi-person live video stream — S42

FIG. 6

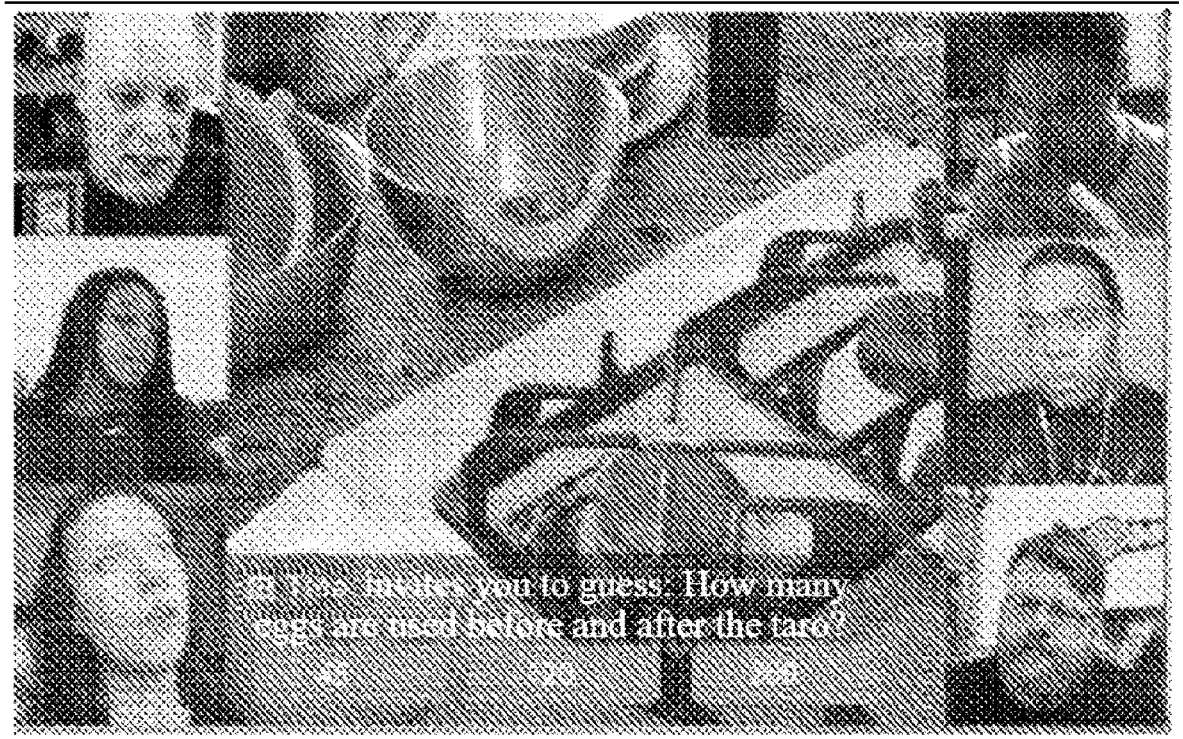

FIG. 9

Obtain a first video and a second video of a live streamer, and obtain a third video of other live streaming members than the live streamer in a live streaming group, where the first video includes a real-time image acquired by a first camera apparatus of the live streamer, the second video includes a video that the live streamer is watching, and the third video includes real-time images acquired by second camera apparatuses of the other live streaming members — S60

Stitch the first video, the second video, and the third video of the other live streaming members, for obtaining a multi-person live video stream, where each frame of the multi-person live video stream includes a frame of the first video, a frame of the second video, and a frame of the third video of the other live streaming members — S61

Send the multi-person live video stream to respective live streaming clients of the live streaming members for the live streaming members to watch — S62

Distribute the multi-person live video stream to a CDN network — S63

FIG. 10

METHOD AND APPARATUS FOR IMPLEMENTING MULTI-PERSON VIDEO LIVE-STREAMING SERVICE, AND COMPUTER DEVICE

CROSS-REFERENCE TO RELATED APPLICATION

The present application is the U.S. National Stage of International Application No. PCT/CN2020/109869, filed on Aug. 18, 2020, which claims the priority of the Chinese Patent Application of Application Number 201911251118.0, filed with the National Intellectual Property Administration, PRC on Dec. 9, 2019, and entitled "Method and apparatus for implementing multi-person video live streaming service, and computer device", both of which are incorporated herein by reference in their entireties.

TECHNICAL FIELD

The present application relates to the technical field of video processing, and in particular to a method and apparatus for implementing a multi-person video live streaming service, and a computer device.

BACKGROUND

With the rapid development of the live streaming industry, an increasing number of users like watching live streaming videos. At present, the mode of communication between users in a live streaming group that watch a live streaming video is limited to sending text information (that is, bullet screen comments) on a live streaming page, and live streaming videos of other users cannot be watched, which results in a single mode of interaction among live streaming users, and thus brings about a relatively poor user experience.

SUMMARY

In view of this, a method and apparatus for implementing a multi-person video live streaming service, a computer device, and a computer-readable storage medium are now provided in order to solve the problem of it being unable to watch live streaming videos of other users by using existing methods during video live streaming.

The present application provides a method for implementing a multi-person video live streaming service, the method including:

obtaining a first video and a second video of a live streamer, and obtaining a third video of other live streaming members than the live streamer in a live streaming group, where the first video includes a real-time image acquired by a first camera apparatus of the live streamer, the second video includes a video that the live streamer is watching, and the third video includes real-time images acquired by second camera apparatuses of the other live streaming members;

stitching the first video, the second video, and the third video of the other live streaming members, for obtaining a multi-person live video stream, where each frame of the multi-person live video stream includes a frame of the first video, a frame of the second video, and a frame of the third video of the other live streaming members; and sending the multi-person live video stream to respective live streaming clients of the live streaming members for the live streaming members to watch.

Optionally, during stitching, facial detection is performed, by using a detection thread, on the first video and the third video of the other live streaming members, and after a face is detected, an area of the detected face is rendered by using a rendering thread.

Optionally, when the second video is a type of dress changing video, synthesizing of each frame of the multi-person live video stream includes:

determining whether a respective timestamp of a second video frame to be synthesized of the second video is a preset timestamp;

performing facial detection on a first video frame to be synthesized of the first video and a third video frame to be synthesized of the third video of the other live streaming members if the respective timestamp of the second video frame to be synthesized of the second video is the preset timestamp;

adding, upon the detection of a face, a preset sticker special effect to the detected face to obtain a video frame to be synthesized having the sticker special effect, where no sticker special effect is added to a video frame to be synthesized with no face detected; and stitching the second video frame to be synthesized, the video frame to be synthesized having the sticker special effect, and the video frame to be synthesized having no sticker special effect, for obtaining a frame of the multi-person live video stream.

Optionally, when the second video is a type of challenge video, synthesizing of each frame of the multi-person live video stream includes:

performing expression recognition on a first video frame to be synthesized of the first video and a third video frame to be synthesized of the third video of the other live streaming members;

adding, when a preset expression is recognized, a preset sticker special effect to a video frame to be synthesized with the preset expression recognized, where no sticker special effect is added to a video frame to be synthesized with no preset expression recognized; and stitching the second video frame to be synthesized of the second video, the video frame to be synthesized having the sticker special effect, and the video frame to be synthesized having no sticker special effect, for obtaining a frame of the multi-person live video stream.

Optionally, when the second video is a type of story guessing video, synthesizing of each frame of the multi-person live video stream includes:

detecting whether a story guessing message sent by any live streaming member in the live streaming group is received;

adding the story guessing message to a second video frame to be synthesized of the second video if the story guessing message sent by any live streaming member in the live streaming group is received; and stitching the second video frame to be synthesized including the story guessing message, a first video frame to be synthesized of the first video, and a third video frame to be synthesized of the third video of the other live streaming members, for obtaining a frame of the multi-person live video stream.

Optionally, the method for implementing a multi-person video live streaming service further includes:

distributing the multi-person live video stream to a CDN network.

Optionally, the method for implementing a multi-person video live streaming service further includes:

reducing the bit rate of the multi-person live video stream.

The present application further provides an apparatus for implementing a multi-person video live streaming service, the apparatus including:

an obtaining module configured to obtain a first video and a second video of a live streamer, and obtain a third video of other live streaming members than the live streamer in a live streaming group, where the first video includes a real-time image acquired by a first camera apparatus of the live streamer, the second video includes a video that the live streamer is watching, and the third video includes real-time images acquired by second camera apparatuses of the other live streaming members;

a stitching module configured to stitch the first video, the second video, and the third video of the other live streaming members, for obtaining a multi-person live video stream, where each frame of the multi-person live video stream includes a frame of the first video, a frame of the second video, and a frame of the third video of the other live streaming members; and a sending module configured to send the multi-person live video stream to respective live streaming clients of the live streaming members for the live streaming members to watch.

The present application further provides a computer device, which includes a memory, a processor, and computer-readable instructions stored in the memory and operable on the processor, where upon executing the computer-readable instructions, the processor implements the steps of the method described above.

The present application further provides a computer-readable storage medium having computer-readable instructions stored thereon, where upon the computer-readable instructions are executed by a processor, the steps of the method described above are implemented.

The above technical solutions have the beneficial effects as follows.

In the embodiments of the present application, a first video and a second video of a live streamer are obtained, and a third video of other live streaming member than the live streamer in a live streaming group is obtained; the first video, the second video, and the third video of the other live streaming members are stitched, for obtaining a multi-person live video stream; and the multi-person live video stream is sent to respective live streaming clients of the live streaming members for the live streaming members to watch. By means of the method for implementing a multi-person video live streaming service in the embodiments of the present application, each live streaming member can watch live streaming video images of all live streaming members in a display interface of his/her live streaming client, and each live streaming member can also watch a video together with a live streamer at the same time, such that the modes of interaction among live streaming members can be increased, thereby improving the user experience.

BRIEF DESCRIPTION OF THE DRAWINGS

FIG. 1 is an architectural diagram of an embodiment of an architectural diagram of a system for implementing a multi-person video live streaming service according to an embodiment of the present application;

FIG. 2 is a flowchart of an embodiment of a method for implementing a multi-person video live streaming service according to the present application;

FIG. 5 is a schematic diagram of a frame of a multi-person live video stream that is obtained after stitching according to another implementation of the present application;

FIG. 6 is a flowchart of detailed steps of the synthesis of each frame of the multi-person live video stream according to another implementation of the present application;

FIG. 9 is a schematic diagram of a frame of a multi-person live video stream that is obtained after stitching according to another implementation of the present application;

FIG. 10 is a flowchart of another embodiment of a method for implementing a multi-person video live streaming service according to the present application;

DETAILED DESCRIPTION OF EMBODIMENTS

Figure 3:
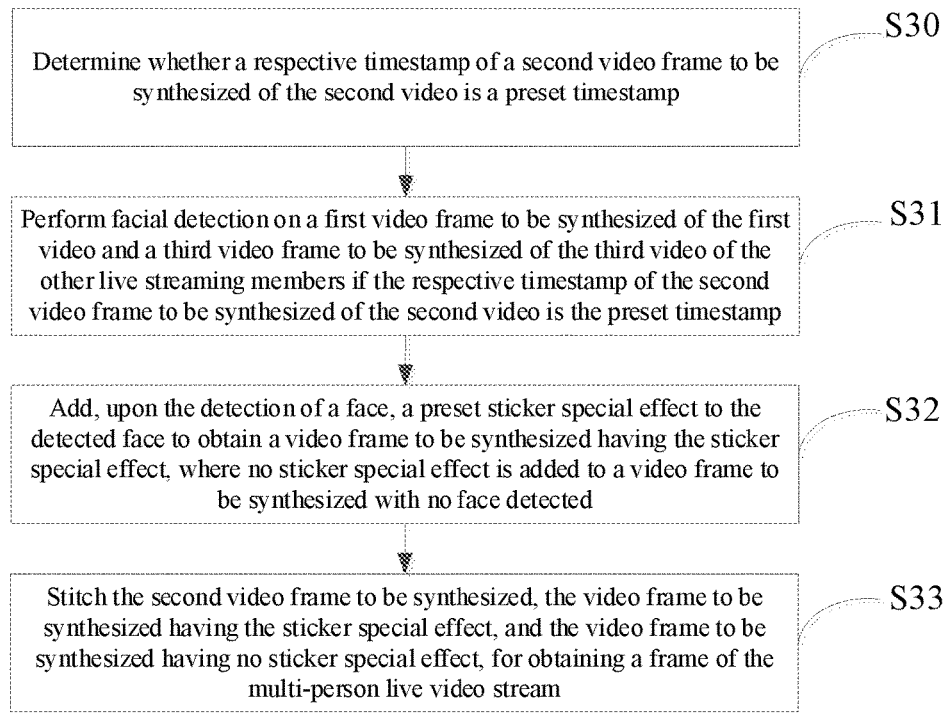
FIG. 3 is a flowchart of detailed steps of the synthesis of each frame of the multi-person live video stream according to an implementation of the present application.

The advantages of the present application are further described below with reference to accompanying drawings and specific embodiments.

Exemplary embodiments are illustrated in detail here, and examples thereof are shown in the accompanying drawings. When the following description refers to the figures, the same numerals in different figures represent the same or similar elements unless otherwise indicated. The implementations described in the following exemplary embodiments do not represent all implementations consistent with the present disclosure. Instead, they are merely examples of apparatuses and methods consistent with some aspects of the present disclosure as detailed in the appended claims.

The terms used in the present disclosure are merely for the purpose of describing specific embodiments, and are not intended to limit the present disclosure. The terms "a/an", "said" and "the" in the singular form used in the present disclosure and the appended claims are also intended to include the plural form unless otherwise clearly indicated in the context. It should also be understood that the term "and/or" used herein refers to and includes any or all possible combinations of one or more of the associated listed items.

It should be understood that although the terms, such as first, second and third, may be used in the present disclosure to describe various types of information, such information should not be limited to these terms. These terms are merely used to distinguish the same type of information from each other. For example, without departing from the scope of the present disclosure, first information may also be referred to as second information, and similarly, second information may also be referred to as first information. Depending on the context, the word "if" as used herein may be interpreted as "when" or "upon" or "in response to the determination".

In the description of the present application, it should be understood that, the reference numerals of steps do not indicate the order of execution of the steps, but are merely to facilitate the description of the present application and differentiation between the steps, and thus will not be interpreted as limiting the present application.

FIG. 1 schematically shows an application environment for a method for implementing a multi-person video live streaming service according to an embodiment of the present application. In the example embodiment, a system for the application environment may include a live streamer terminal 10, a live streaming participant (i.e., a live streaming member, other than a live streamer, in a live streaming group) terminal 20, and a server 30. The live streamer terminal 10, the live streaming participant terminal 20, and the server 30 are connected in a wireless or wired manner, and there is a respective application client or webpage client on the live streamer terminal 10 and the live streaming participant terminal 20. By means of the application client or webpage client, the live streamer terminal 10 and the live streaming participant terminal 2 upload a live video stream to the server 30, such that the server 30 can be triggered to perform the method for implementing a multi-person video live streaming service. The live streamer terminal 10 and the live streaming participant terminal 20 may be personal computers (PC), mobile phones, iPADs, tablet computers, notebook computers, personal digital assistants, etc.

FIG. 2 is a schematic flowchart of a method for implementing a multi-person video live streaming service according to an embodiment of the present application. It can be understood that the flow chart in this method embodiment is not used to limit the order of execution of the steps. An exemplary description is made below by taking a server as an execution subject. It can be seen from the figure that the method for implementing a multi-person video live streaming service provided in this embodiment includes the step as follows.

In step S20, a first video and a second video of a live streamer are obtained, and a third video of other live streaming members than the live streamer in a live streaming group is obtained, where the first video includes a real-time image acquired by a first camera apparatus of the live streamer, the second video includes a video that the live streamer is watching, and the third video includes real-time images acquired by second camera apparatuses of the other live streaming members.

Specifically, in the embodiment of the present application, during a multi-person live streaming service, the live streamer and the other live streaming members than the live streamer in the live streaming group upload a live video stream to a server through their respective live streaming clients.

The first camera apparatus may be a camera apparatus (for example, a camera) built in a live streamer terminal, or may be a camera apparatus externally connected to the live streamer terminal. The first camera apparatus can be used to acquire a first video, and the first video is the current live streaming image of the live streamer, that is, a real-time image acquired by the first camera apparatus. Preferably, the first video includes the face of the live streamer. The second video that the live streamer is watching is a video that is played by the live streamer terminal and that the live streamer wants to watch together with the other live streaming members, and the video may be a local video, or may be an online video. The second video may be various types of videos, for example, a dress changing video, a challenge video, a story guessing video, etc. The second camera apparatus may be a camera apparatus (for example, a camera) built in a live streaming participant (the other live streaming member) terminal, or may be a camera apparatus externally connected to the live streaming participant terminal. The second camera apparatus can be used to acquire a third video, and the third video includes the current live streaming images of live streaming participants, that is, real-time images acquired by the second camera apparatuses. Preferably, the third video includes the faces of the live streaming participants.

It should be noted that, in the embodiment of the present application, before the multi-person live streaming service, the live streamer should first create a live streaming group so that a plurality of live streaming participants join the live streaming group. After the plurality of live streaming participants join the live streaming group, the live streamer can start the multi-person live streaming service.

In step S21, the first video, the second video, and the third video of the other live streaming members are stitched, for obtaining a multi-person live video stream, where each frame of the multi-person live video stream includes a frame of the first video, a frame of the second video, and a frame of the third video of the other live streaming members.

Specifically, stitching is performed frame by frame. First frames of the first video, the second video, and the third video of the other live streaming members are first obtained, and the obtained first frames are then stitched for obtaining a first frame of the multi-person live video stream. In other words, the synthesized first frame of the multi-person live video stream includes live streaming video frames of all the live streaming members. In this way, each live streaming member can see the live streaming frames of all the live streaming members in a display interface of his/her live streaming client.

In an implementation, during stitching, a synthesized frame of the multi-person live video stream can be divided, according to the number of live streaming members, into display blocks corresponding to the number of live streaming members. For example, if there are six live streaming members in the live streaming group, the frame of the multi-person live video stream can be divided into seven blocks, where six blocks of frames are used to display video frames of the live streaming members, and the remaining block of frame is used to display a frame of a video that the live streamer is watching. Each live streaming member watching the multi-person live video stream achieves the effect that he/she sees, in the display interface of his/her live streaming client, live streaming images of the six live streaming members and also the image of the video that the live streamer is watching.

It should be noted that, after the synthesis of the first frame of the multi-person live video stream, second frames of the first video, the second video, and the third video of the other live streaming members are further obtained, and the obtained second frames are then stitched for obtaining a second frame of the multi-person live video stream, and so on until the syntheses of all frames of the multi-person live video stream are completed.

In an implementation of the present application, in order to prevent video lagging from occurring when the live streaming members are watching the multi-person live video stream, during stitching, facial detection can be performed, by using a detection thread, on the first video and the third video of the other live streaming members, and after a face is detected, an area of the detected face is rendered by using a rendering thread. In the embodiment of the present application, the use of a single thread for video synthesis, and the use of a plurality of threads for video synthesis can reduce the time for video synthesis, and then cause the video lagging during the watching of the multi-person live video stream.

It should be noted that, in other implementations of the present application, during stitching, more threads may also be used for processing video frames to be synthesized, for obtaining the multi-person live video stream.

Exemplarily, in an implementation, referring to FIG. 3, when the second video is a type of dress changing video, the synthesis of each frame of the multi-person live video stream includes the steps as follows.

In step S30, it is determined whether a respective timestamp of a second video frame to be synthesized of the second video is a preset timestamp.

Specifically, when the second video is the type of dress changing video, during the synthesis of each frame of the multi-person live video stream, it is first determined whether a respective timestamp of a second video frame to be synthesized of the second video is a preset timestamp. In this embodiment, timestamp information in the second video frame to be synthesized can be directly obtained, and the obtained timestamp information is then compared with the preset timestamp, so as to determine whether the respective timestamp of the second video frame to be synthesized is the same as the preset timestamp. In the embodiment of the present application, the preset timestamp may be one or more points of time preset by the live streamer, or may be one or more default points of time preset by a system, which is not limited in the implementation of the present application.

The dress changing video means that when live streaming users are watching this type of video, and a particular point of time at which the video is played is reached, a server adds corresponding sticker special effects to all the live streaming users, so as to realize dress changing.

It should be noted that, the second video frame to be synthesized is the current video frame to be synthesized of the second video. For example, when the synthesis of the first frame of the multi-person live video stream is currently being performed, the second video frame to be synthesized is a first frame of the second video. For another example, when the synthesis of a third frame of the multi-person live video stream is currently being performed, the second video frame to be synthesized is a third frame of the second video.

In step S31, facial detection is performed on a first video frame to be synthesized of the first video and a third video frame to be synthesized of the third video of the other live streaming members if the respective timestamp of the second video frame to be synthesized of the second video is the preset timestamp.

Specifically, when it is determined that the respective timestamp of the second video frame to be synthesized is the preset timestamp, facial detection can be performed, by using a facial recognition model, on the first video frame to be synthesized of the first video and the third video frame to be synthesized of the third video of the other live streaming members, where the facial recognition model is an existing model for facial detection, and will not be described in detail in this embodiment.

It should be noted that, the first video frame to be synthesized and the third video frame to be synthesized are respectively the current video frame to be synthesized of the first video and the current video frame to be synthesized of the third video. For example, when the synthesis of the first frame of the multi-person live video stream is currently being performed, the first video frame to be synthesized is a first frame of the first video, and the third video frame to be synthesized is a first frame of the third video. For another example, when the synthesis of a third frame of the multi-person live video stream is currently being performed, the first video frame to be synthesized is a third frame of the first video, and the third video frame to be synthesized is a third frame of the third video.

In the embodiment of the present application, when it is determined that the respective timestamp of the second video frame to be synthesized is not the preset timestamp, the synthesis of a video frame can be directly performed without facial detection.

In step S32, upon the detection of a face, a preset sticker special effect is added to the detected face to obtain a video frame to be synthesized having the sticker special effect, where no sticker special effect is added to a video frame to be synthesized with no face detected.

Specifically, the sticker special effect may be a preset makeup sticker, an eye shadow or gesture special effect, a funny dress-changing special effect, etc.

It should be noted that, in the embodiment of the present application, during the addition of the sticker special effect, the same or different sticker effects may be added to the faces of all live streaming members, or sticker special effects may be added only to one or more live streaming members, which is not limited in this embodiment.

In step S33, the second video frame to be synthesized, the video frame to be synthesized having the sticker special effect, and the video frame to be synthesized having no sticker special effect are stitched, for obtaining a frame of the multi-person live video stream.

Figure 4:
FIG. 4 is a schematic diagram of a frame of a multi-person live video stream that is obtained after stitching according to an implementation of the present application.

Specifically, after the sticker effect is added, the second video frame to be synthesized, the video frame to be synthesized having the sticker special effect, and the video frame to be synthesized having no sticker effect can be stitched and synthesized, for obtaining the frame of the multi-person live video stream. For example, the frame of the multi-person live video stream that is obtained after stitching is as shown in FIG. 4 or FIG. 5. FIG. 4 is a schematic diagram of a synthesized frame obtained by adding a sticker special effect to only one live streaming user. FIG. 5 is a schematic diagram of a synthesized frame obtained by adding sticker special effects to all live streaming users.

In this embodiment, when it is determined that the respective timestamp of the current video frame to be synthesized of the second video that the live streamer is watching is the preset timestamp, preset sticker special effects are added to the faces of live streaming users, so as to arouse greater interest of the live streaming users in watching a video together, thereby improving the user experience.

In another implementation, referring to FIG. 6, when the second video is a type of challenge video, the synthesis of each frame of the multi-person live video stream includes the steps as follows.

In step S40, expression recognition is performed on a first video frame to be synthesized of the first video and a third video frame to be synthesized of the third video of the other live streaming members.

Specifically, when the second video is the type of challenge video, during the synthesis of each frame of the multi-person live video stream, expression recognition should be first performed on the first video frame to be synthesized of the first video and the third video frame to be synthesized of the third video of the other live streaming members. In the embodiment of the present application, expression recognition can be performed, by using an expression recognition model, on the first video frame to be synthesized and the third video frame to be synthesized of the other live streaming member, where the expression recognition model may be an existing model for expression recognition, and will not be described in detail in this embodiment.

The challenge video means that when live streaming users are watching this type of video, the live streaming users may launch a challenge (PK). For example, when the challenge video is a Try-Not-To-Laugh challenge video, the live streaming users may challenge each other to see who will laugh first. The user to laugh first will be out. For another example, when the challenge video is a Try-Not-To-Cry challenge video, the live streaming users may challenge each other to see who will shed tears first. The user to shed tears first will be out.

It should be noted that, in this instance, the first video frame to be synthesized and the third video frame to be synthesized are respectively the current video frame to be synthesized of the first video and the current video frame to be synthesized of the third video. For example, when the synthesis of the first frame of the multi-person live video stream is currently being performed, the first video frame to be synthesized is a first frame of the first video, and the third video frame to be synthesized is a first frame of the third video. For another example, when the synthesis of a third frame of the multi-person live video stream is currently being performed, the first video frame to be synthesized is a third frame of the first video, and the third video frame to be synthesized is a third frame of the third video.

In step S41, when a preset expression is recognized, a preset sticker special effect is added to a video frame to be synthesized with the preset expression recognized, where no sticker special effect is added to a video frame to be synthesized with no preset expression recognized.

Specifically, the preset expression is the expression set in advance, for example, a smile face, a cry face, etc. The sticker special effect may be the sticker special effect set in advance to demonstrate that a live streaming user has lost the challenge, such as being "out".

In step S42, the second video frame to be synthesized of the second video, the video frame to be synthesized having the sticker special effect, and the video frame to be synthesized having no sticker special effect are stitched, for obtaining a frame of the multi-person live video stream.

Figure 7:
FIG. 7 is a schematic diagram of a frame of a multi-person live video stream that is obtained after stitching according to another implementation of the present application.

Specifically, after the sticker effect is added, the second video frame to be synthesized, the video frame to be synthesized having the sticker special effect, and the video frame to be synthesized having no sticker effect can be stitched and synthesized, for obtaining the frame of the multi-person live video stream. Exemplarily, the frame of the multi-person live video stream that is obtained after stitching is as shown in FIG. 7.

It should be noted that, the second video frame to be synthesized is the current video frame to be synthesized of the second video. For example, when the synthesis of a first frame of the multi-person live video stream is currently being performed, the second video frame to be synthesized is a first frame of the second video. For another example, when the synthesis of a third frame of the multi-person live video stream is currently being performed, the second video frame to be synthesized is a third frame of the second video.

In this embodiment, when the second video that the live streamer is watching is the challenge video, the live streaming users may challenge each other to enhance the enjoyment of watching the video of the live streaming users, thereby improving the user experience.

Figure 8:
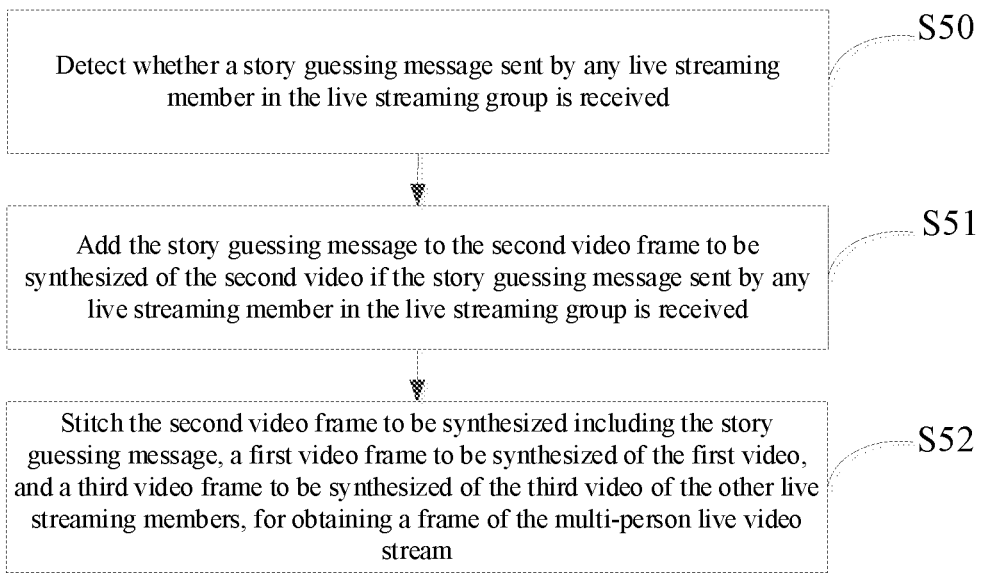
FIG. 8 is a flowchart of detailed steps of the synthesis of each frame of the multi-person live video stream according to another implementation of the present application.

In another implementation, referring to FIG. 8, when the second video is a type of story guessing video, the synthesis of each frame of the multi-person live video stream includes the steps as follows.

In step S50, it is detected whether a story guessing message sent by any live streaming member in the live streaming group is received.

Specifically, when the second video is the type of story guessing video, during the synthesis of each frame of the multi-person live video stream, it should be first detected whether a story guessing message sent by any live streaming member in the live streaming group is received. That is, when the live streaming members are watching the video together, any one of the live streaming members may send the story guessing message to invite other live streaming members to guess what will happen to the story of the video that they are watching together. For example, the live streaming members are watching a story guessing video showing frying eggs. During watching, a live streaming member may send a story guessing message to invite other live streaming members to guess how many eggs a user who fries eggs have used in the video. The story guessing message may be a message including candidate answers, or may be a message including no candidate answers and only including a question for guessing.

In step S51, the story guessing message is added to the second video frame to be synthesized of the second video if the story guessing message sent by any live streaming member in the live streaming group is received.

Specifically, if a story guessing message sent by a live streaming member is received, the story guessing message can be added to the second video frame to be synthesized of the second video.

In the embodiment of the present application, when the story guessing message sent by any live streaming member in the live streaming group is not received, the synthesis of a video frame of the multi-person live video stream can be directly performed.

It should be noted that, the second video frame to be synthesized is the current video frame to be synthesized of the second video. For example, when the synthesis of a first frame of the multi-person live video stream is currently being performed, the second video frame to be synthesized is a first frame of the second video. For another example, when the synthesis of a third frame of the multi-person live video stream is currently being performed, the second video frame to be synthesized is a third frame of the second video.

In step S52, the second video frame to be synthesized including the story guessing message, a first video frame to be synthesized of the first video, and a third video frame to be synthesized of the third video of the other live streaming members are stitched, for obtaining a frame of the multi-person live video stream.

Specifically, after the story guessing message is added, the second video frame to be synthesized including the story guessing message, a first video frame to be synthesized of the first video, and a third video frame to be synthesized of the third video of the other live streaming members are stitched and synthesized, for obtaining a frame of the multi-person live video stream. Exemplarily, the frame of the multi-person live video stream that is obtained after stitching is as shown in FIG. 9.

It should be noted that, the first video frame to be synthesized and the third video frame to be synthesized are respectively the current video frame to be synthesized of the first video and the current video frame to be synthesized of the third video. For example, when the synthesis of the first frame of the multi-person live video stream is currently being performed, the first video frame to be synthesized is a first frame of the first video, and the third video frame to be synthesized is a first frame of the third video. For another example, when the synthesis of a third frame of the multi-person live video stream is currently being performed, the first video frame to be synthesized is a third frame of the first video, and the third video frame to be synthesized is a third frame of the third video.

In this embodiment, when the second video that the live streamer is watching is the story guessing video, any live streaming member may send a story guessing message to invite other live streaming members to guess what will happen to the story next, so as to strength the interaction between live streaming members, thereby improving the user experience.

In step S22, the multi-person live video stream is sent to respective live streaming clients of the live streaming members for the live streaming members to watch.

Specifically, the live streaming members include the live streamer and other live streaming members than the live streamer in the live streaming group.

In the embodiment of the present application, after the synthesis of the multi-person live video stream, the multi-person live video stream is sent to the respective live streaming clients of the live streaming members, so that the live streaming members can watch both the video images of all the live streaming members and the frame of the video that the live streamer is watching.

In the embodiments of the present application, a first video and a second video of a live streamer are obtained, and a third video of other live streaming member than the live streamer in a live streaming group is obtained; the first video, the second video, and the third video of the other live streaming members are stitched, for obtaining a multi-person live video stream; and the multi-person live video stream is sent to respective live streaming clients of the live streaming members for the live streaming members to watch. By means of the method for implementing a multi-person video live streaming service in the embodiments of the present application, each live streaming member can watch live streaming video images of all live streaming members in a display interface of his/her live streaming client, and each live streaming member can also watch a video together with a live streamer at the same time, such that the modes of interaction among live streaming members can be increased, thereby improving the user experience.

Further, FIG. 10 is a schematic flowchart of a method for implementing a multi-person video live streaming service according to another embodiment of the present application. It can be seen from the figure that the method for implementing a multi-person video live streaming service provided in this embodiment includes the step as follows.

In step S60, a first video and a second video of a live streamer are obtained, and a third video of other live streaming members than the live streamer in a live streaming group is obtained, where the first video includes a real-time image acquired by a first camera apparatus of the live streamer, the second video includes a video that the live streamer is watching, and the third video includes real-time images acquired by second camera apparatuses of the other live streaming members.

In step S61, the first video, the second video, and the third video of the other live streaming members are stitched, for obtaining a multi-person live video stream, where each frame of the multi-person live video stream includes a frame of the first video, a frame of the second video, and a frame of the third video of the other live streaming members.

In step S62, the multi-person live video stream is sent to respective live streaming clients of the live streaming members for the live streaming members to watch.

Specifically, the above steps S60 to S62 are the same as steps S20 to S22 in the above embodiments, and will not be described in detail in this embodiment.

In step S63, the multi-person live video stream is distributed to a CDN network.

Specifically, after the multi-person live video stream is obtained, in order that other users can also watch the multi-person live video stream, the multi-person live video stream may be distributed to a content delivery network (CDN). In this way, other users may download, from the CDN network and according to their needs, a multi-person live video stream of the type they prefer, and then play and watch same.

In the embodiment of the present application, the multi-person live video stream is distributed to the CDN network, so that other users can also download the live video stream from the CDN network as desired, and then play and watch same, thereby increasing the types of videos that users can watch.

Figure 11:
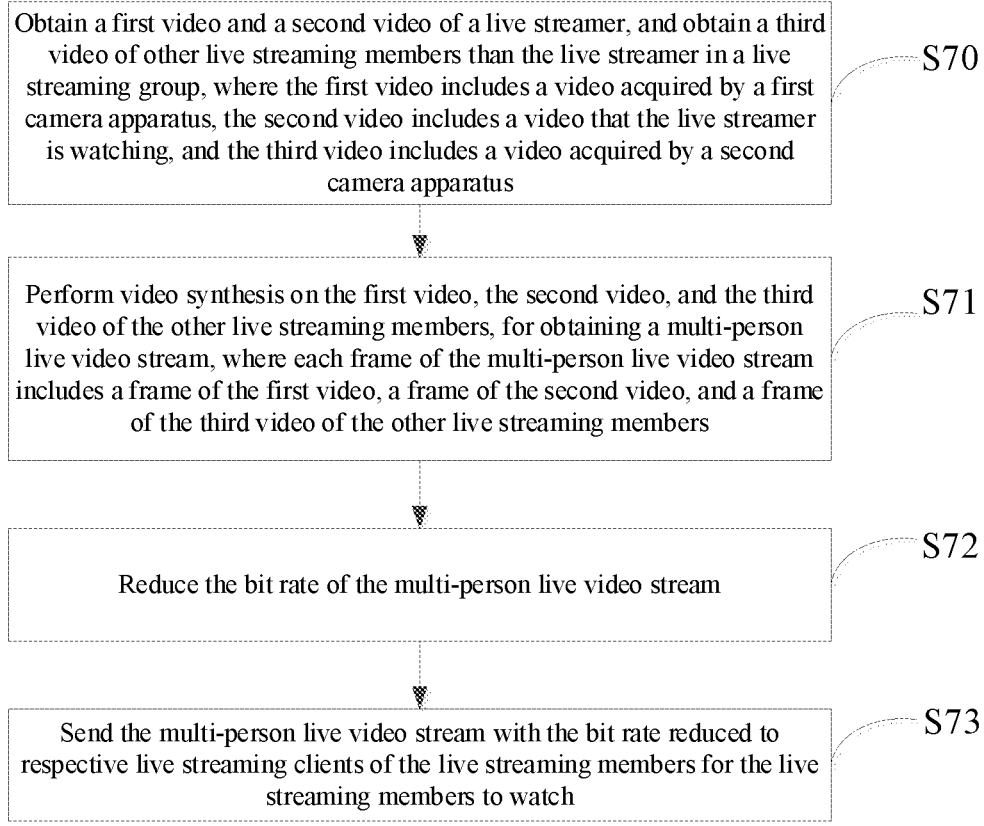
FIG. 11 is a flowchart of another embodiment of a method for implementing a multi-person video live streaming service according to the present application.

Further, FIG. 11 is a schematic flowchart of a method for implementing a multi-person video live streaming service according to another embodiment of the present application. It can be seen from the figure that the method for implementing a multi-person video live streaming service provided in this embodiment includes the step as follows.

In step S70, a first video and a second video of a live streamer are obtained, and a third video of other live streaming members than the live streamer in a live streaming group is obtained, where the first video includes a real-time image acquired by a first camera apparatus of the live streamer, the second video includes a video that the live streamer is watching, and the third video includes real-time images acquired by second camera apparatuses of the other live streaming members.

In step S71, the first video, the second video, and the third video of the other live streaming members are stitched, for obtaining a multi-person live video stream, where each frame of the multi-person live video stream includes a frame of the first video, a frame of the second video, and a frame of the third video of the other live streaming members.

In step S72, the reduction in the bit rate of the multi-person live video stream is performed.

Specifically, in order to prevent video lagging from occurring when the live streaming members are watching the multi-person live video stream, the reduction in the bit rate of the multi-person live video stream can be performed before the multi-person live video stream is sent to the respective live streaming clients of the live streaming members, so that network resources occupied by the multi-person live video stream are reduced. The bit rate here is the number of bits transmitted per second. The higher the bit rate, the higher the speed of data transmission.

In step S73, the multi-person live video stream with the bit rate reduced is sent to respective live streaming clients of the live streaming members for the live streaming members to watch.

In the embodiment of the present application, the reduction in the bit rate of the multi-person live video stream is performed, so that the time consumed for sending the multi-person live video stream to the respective live streaming clients of the live streaming members can be reduced, thereby achieving a better live streaming effect.

Figure 12:
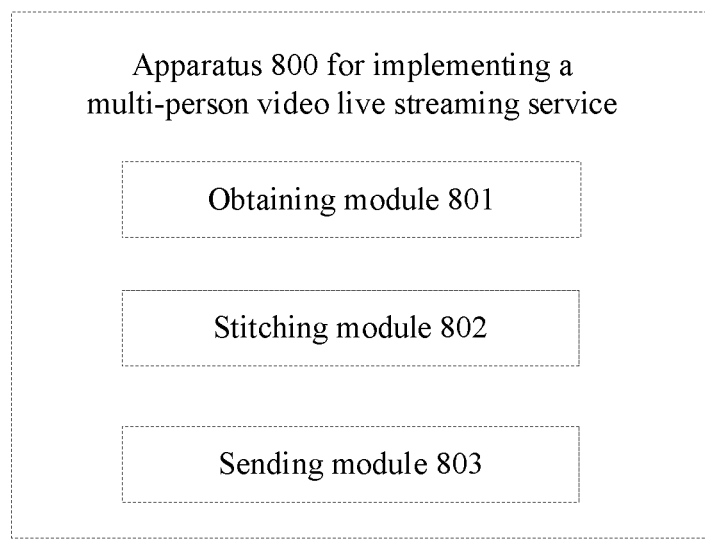
FIG. 12 is a module diagram of an embodiment of an apparatus for implementing a multi-person video live streaming service according to the present application.

FIG. 12 is a diagram of program modules in an embodiment of an apparatus 800 for implementing a multi-person video live streaming service according to the present application.

In this embodiment, the apparatus 800 for implementing a multi-person video live streaming service includes a series of computer-readable instructions stored in a memory, where when the computer-readable instructions are executed by a processor, the function of implementing the multi-person video live streaming service according to the embodiments of the present application can be implemented. In some embodiments, the apparatus 800 for implementing a multi-person video live streaming service may be divided into one or more modules on the basis of specific operations implemented by various parts of the computer-readable instructions. For example, in FIG. 7, the apparatus 800 for implementing a multi-person video live streaming service may be divided into an obtaining module 801, a stitching module 802, and a sending module 803. In the modules:

the obtaining module 801 is configured to obtain a first video and a second video of a live streamer, and obtain a third video of other live streaming members than the live streamer in a live streaming group, where the first video includes a video acquired by a first camera apparatus, the second video includes a video that the live streamer is watching, and the third video includes a video acquired by a second camera apparatus.

Specifically, in the embodiment of the present application, during a multi-person live streaming service, the live streamer and the other live streaming members than the live streamer in the live streaming group upload a live video stream to a server through their respective live streaming clients.

The first camera apparatus may be a camera apparatus (for example, a camera) built in a live streamer terminal, or may be a camera apparatus externally connected to the live streamer terminal. The first camera apparatus can be used to acquire a first video, and the first video is the current live streaming image of the live streamer, that is, a real-time image acquired by the first camera apparatus. Preferably, the first video includes the face of the live streamer. The second video that the live streamer is watching is a video that is played by the live streamer terminal and that the live streamer wants to watch together with the other live streaming members, and the video may be a local video, or may be an online video. The second video may be various types of videos, for example, a dress changing video, a challenge video, a story guessing video, etc. The second camera apparatus may be a camera apparatus (for example, a camera) built in a live streaming participant (the other live streaming member) terminal, or may be a camera apparatus externally connected to the live streaming participant terminal. The second camera apparatus can be used to acquire a third video, and the third video includes the current live streaming images of live streaming participants, that is, real-time images acquired by the second camera apparatuses. Preferably, the third video includes the faces of the live streaming participants.

It should be noted that, in the embodiment of the present application, before the multi-person live streaming service, the live streamer should first create a live streaming group so that a plurality of live streaming participants join the live streaming group. After the plurality of live streaming participants join the live streaming group, the live streamer can start the multi-person live streaming service.

The stitching module 802 is configured to stitch the first video, the second video, and the third video of the other live streaming members, for obtaining a multi-person live video stream, where each frame of the multi-person live video stream includes a frame of the first video, a frame of the second video, and a frame of the third video of the other live streaming members.

Specifically, stitching is performed frame by frame. First frames of the first video, the second video, and the third video of the other live streaming members are first obtained, and the obtained first frames are then stitched for obtaining a first frame of the multi-person live video stream. In other words, the synthesized first frame of the multi-person live video stream includes live streaming video frames of all the live streaming members. In this way, each live streaming member can see the live streaming frames of all the live streaming members in a display interface of his/her live streaming client.

In an implementation, during stitching, a synthesized frame of the multi-person live video stream can be divided, according to the number of live streaming members, into display blocks corresponding to the number of live streaming members. For example, if there are six live streaming members in the live streaming group, the frame of the multi-person live video stream can be divided into seven blocks, where six blocks of frames are used to display video frames of the live streaming members, and the remaining block of frame is used to display a frame of a video that the live streamer is watching. Each live streaming member watching the multi-person live video stream achieves the effect that he/she sees, in the display interface of his/her live streaming client, live streaming images of the six live streaming members and also the image of the video that the live streamer is watching.

It should be noted that, after the synthesis of the first frame of the multi-person live video stream, second frames of the first video, the second video, and the third video of the other live streaming members are further obtained, and the obtained second frames are then stitched for obtaining a second frame of the multi-person live video stream, and so on until the syntheses of all frames of the multi-person live video stream are completed.

In an implementation of the present application, in order to prevent video lagging from occurring when the live streaming members are watching the multi-person live video stream, during stitching, facial detection can be performed, by using a detection thread, on the first video and the third video of the other live streaming members, and after a face is detected, an area of the detected face is rendered by using a rendering thread. In the embodiment of the present application, the use of a single thread for video synthesis, and the use of a plurality of threads for video synthesis can reduce the time for video synthesis, and then prevent video lagging from occurring during the watching of the multi-person live video stream.

It should be noted that, in other implementations of the present application, during stitching, more threads may also be used for processing video frames to be synthesized, for obtaining the multi-person live video stream.

Exemplarily, in an implementation, when the second video is a type of dress changing video, the stitching module 802 is further configured to determine whether a respective timestamp of a second video frame to be synthesized of the second video is a preset timestamp.

Specifically, when the second video is the type of dress changing video, during the synthesis of each frame of the multi-person live video stream, it is first determined whether a respective timestamp of a second video frame to be synthesized of the second video is a preset timestamp. In this embodiment, timestamp information in the second video frame to be synthesized can be directly obtained, and the obtained timestamp information is then compared with the preset timestamp, so as to determine whether the respective timestamp of the second video frame to be synthesized is the same as the preset timestamp. In the embodiment of the present application, the preset timestamp may be one or more points of time preset by the live streamer, or may be one or more default points of time preset by a system, which is not limited in the implementation of the present application.

The dress changing video means that when live streaming users are watching this type of video, and a particular point of time at which the video is played is reached, a server adds corresponding sticker special effects to all the live streaming users, so as to realize dress changing.

It should be noted that, the second video frame to be synthesized is the current video frame to be synthesized of the second video. For example, when the synthesis of the first frame of the multi-person live video stream is currently being performed, the second video frame to be synthesized is a first frame of the second video. For another example, when the synthesis of a third frame of the multi-person live video stream is currently being performed, the second video frame to be synthesized is a third frame of the second video.

The stitching module 802 is further configured to perform facial detection on a first video frame to be synthesized of the first video and a third video frame to be synthesized of the third video of the other live streaming members if the respective timestamp of the second video frame to be synthesized of the second video is the preset timestamp.

Specifically, when it is determined that the respective timestamp of the second video frame to be synthesized is the preset timestamp, facial detection can be performed, by using a facial recognition model, on the first video frame to be synthesized of the first video and the third video frame to be synthesized of the third video of the other live streaming members, where the facial recognition model is an existing model for facial detection, and will not be described in detail in this embodiment.

It should be noted that, the first video frame to be synthesized and the third video frame to be synthesized are respectively the current video frame to be synthesized of the first video and the current video frame to be synthesized of the third video. For example, when the synthesis of the first frame of the multi-person live video stream is currently being performed, the first video frame to be synthesized is a first frame of the first video, and the third video frame to be synthesized is a first frame of the third video. For another example, when the synthesis of a third frame of the multi-person live video stream is currently being performed, the first video frame to be synthesized is a third frame of the first video, and the third video frame to be synthesized is a third frame of the third video.

In the embodiment of the present application, when it is determined that the respective timestamp of the second video frame to be synthesized is not the preset timestamp, the synthesis of a video frame can be directly performed without facial detection.

The stitching module 802 is further configured to add, upon the detection of a face, a preset sticker special effect to the detected face to obtain a video frame to be synthesized having the sticker special effect, where no sticker special effect is added to a video frame to be synthesized with no face detected.

Specifically, the sticker special effect may be a preset makeup sticker, an eye shadow or gesture special effect, a funny dress-changing special effect, etc.

It should be noted that, in the embodiment of the present application, during the addition of the sticker special effect, the same or different sticker effects may be added to the faces of all live streaming members, or sticker special effects may be added only to one or more live streaming members, which is not limited in this embodiment.

The stitching module 802 is further configured to stitch the second video frame to be synthesized, the video frame to be synthesized having the sticker special effect, and the video frame to be synthesized having no sticker special effect, for obtaining a frame of the multi-person live video stream.

Specifically, after the sticker effect is added, the second video frame to be synthesized, the video frame to be synthesized having the sticker special effect, and the video frame to be synthesized having no sticker effect can be stitched and synthesized, for obtaining the frame of the multi-person live video stream. For example, the frame of the multi-person live video stream that is obtained after stitching is as shown in FIG. 4 or FIG. 5. FIG. 4 is a schematic diagram of a synthesized frame obtained by adding a sticker special effect to only one live streaming user. FIG. 5 is a schematic diagram of a synthesized frame obtained by adding sticker special effects to all live streaming users.

In this embodiment, when it is determined that the respective timestamp of the current video frame to be synthesized of the second video that the live streamer is watching is the preset timestamp, preset sticker special effects are added to the faces of live streaming users, so as to arouse greater interest of the live streaming users in watching a video together, thereby improving the user experience.

In another implementation, when the second video is a type of challenge video, the stitching module 802 is further configured to perform expression recognition on a first video frame to be synthesized of the first video and a third video frame to be synthesized of the third video of the other live streaming members.

Specifically, when the second video is the type of challenge video, during the synthesis of each frame of the multi-person live video stream, expression recognition should be first performed on the first video frame to be synthesized of the first video and the third video frame to be synthesized of the third video of the other live streaming members. In the embodiment of the present application, expression recognition can be performed, by using an expression recognition model, on the first video frame to be synthesized and the third video frame to be synthesized of the other live streaming member, where the expression recognition model may be an existing model for expression recognition, and will not be described in detail in this embodiment.

The challenge video means that when live streaming users are watching this type of video, the live streaming users may launch a challenge (PK). For example, when the challenge video is a Try-Not-To-Laugh challenge video, the live streaming users may challenge each other to see who will laugh first. The user to laugh first will be out. For another example, when the challenge video is a Try-Not-To-Cry challenge video, the live streaming users may challenge each other to see who will shed tears first. The user to shed tears first will be out.

The stitching module 802 is further configured to add, when a preset expression is recognized, a preset sticker special effect to a video frame to be synthesized with the preset expression recognized, where no sticker special effect is added to a video frame to be synthesized with no preset expression recognized.

Specifically, the preset expression is the expression set in advance, for example, a smile face, a cry face, etc. The sticker special effect may be the sticker special effect set in advance to demonstrate that a live streaming user has lost the challenge, such as being "out".

The stitching module 802 is further configured to stitch the second video frame to be synthesized of the second video, the video frame to be synthesized having the sticker special effect, and the video frame to be synthesized having no sticker special effect, for obtaining a frame of the multi-person live video stream.

Specifically, after the sticker effect is added, the second video frame to be synthesized, the video frame to be synthesized having the sticker special effect, and the video frame to be synthesized having no sticker effect can be stitched and synthesized, for obtaining the frame of the multi-person live video stream. Exemplarily, the frame of the multi-person live video stream that is obtained after stitching is as shown in FIG. 7.

In this embodiment, when the second video that the live streamer is watching is the challenge video, the live streaming users may challenge each other to enhance the enjoyment of watching the video of the live streaming users, thereby improving the user experience.

In another implementation, when the second video is a type of story guessing video, the stitching module 802 is further configured to detect whether a story guessing message sent by any live streaming member in the live streaming group is received.

Specifically, when the second video is the type of story guessing video, during the synthesis of each frame of the multi-person live video stream, it should be first detected whether a story guessing message sent by any live streaming member in the live streaming group is received. That is, when the live streaming members are watching the video together, any one of the live streaming members may send the story guessing message to invite other live streaming members to guess what will happen to the story of the video that they are watching together. For example, the live streaming members are watching a story guessing video showing frying eggs. During watching, a live streaming member may send a story guessing message to invite other live streaming members to guess how many eggs a user who fries eggs have used in the video. The story guessing message may be a message including candidate answers, or may be a message including no candidate answers and only including a question for guessing.

The stitching module 802 is further configured to add the story guessing message to the second video frame to be synthesized of the second video if the story guessing message sent by any live streaming member in the live streaming group is received.

Specifically, if a story guessing message sent by a live streaming member is received, the story guessing message can be added to the second video frame to be synthesized of the second video.

In the embodiment of the present application, when the story guessing message sent by any live streaming member in the live streaming group is not received, the synthesis of a video frame of the multi-person live video stream can be directly performed.

The stitching module 802 is further configured to stitch the second video frame to be synthesized including the story guessing message, a first video frame to be synthesized of the first video, and a third video frame to be synthesized of the third video of the other live streaming members, for obtaining a frame of the multi-person live video stream.

Specifically, after the story guessing message is added, the second video frame to be synthesized including the story guessing message, a first video frame to be synthesized of the first video, and a third video frame to be synthesized of the third video of the other live streaming members are stitched and synthesized, for obtaining a frame of the multi-person live video stream. Exemplarily, the frame of the multi-person live video stream that is obtained after stitching is as shown in FIG. 9.

In this embodiment, when the second video that the live streamer is watching is the story guessing video, any live streaming member may send a story guessing message to invite other live streaming members to guess what will happen to the story next, so as to strength the interaction between live streaming members, thereby improving the user experience.

The sending module 803 is configured to send the multi-person live video stream to respective live streaming clients of the live streaming members for the live streaming members to watch.

Specifically, the live streaming members include the live streamer and other live streaming members than the live streamer in the live streaming group.

In the embodiment of the present application, after the synthesis of the multi-person live video stream, the multi-person live video stream is sent to the respective live streaming clients of the live streaming members, so that the live streaming members can watch both the video images of all the live streaming members and the frame of the video that the live streamer is watching.

In the embodiments of the present application, a first video and a second video of a live streamer are obtained, and a third video of other live streaming member than the live streamer in a live streaming group is obtained; the first video, the second video, and the third video of the other live streaming members are stitched, for obtaining a multi-person live video stream; and the multi-person live video stream is sent to respective live streaming clients of the live streaming members for the live streaming members to watch. By means of the method for implementing a multi-person video live streaming service in the embodiments of the present application, each live streaming member can watch live streaming video images of all live streaming members in a display interface of his/her live streaming client, and each live streaming member can also watch a video together with a live streamer at the same time, such that the modes of interaction among live streaming members can be increased, thereby improving the user experience.

Further, in an implementation, the apparatus 800 for implementing a multi-person video live streaming service further includes a distribution module.

The distribution module is configured to distribute the multi-person live video stream to a CDN network.

Specifically, after the multi-person live video stream is obtained, in order that other users can also watch the multi-person live video stream, the multi-person live video stream may be distributed to a content delivery network (CDN). In this way, other users may download, from the CDN network and according to their needs, a multi-person live video stream of the type they prefer, and then play and watch same.

In the embodiment of the present application, the multi-person live video stream is distributed to the CDN network, so that other users can also download the live video stream from the CDN network as desired, and then play and watch same, thereby increasing the types of videos that users can watch.

Further, in another implementation, the apparatus 800 for implementing a multi-person video live streaming service further includes a processing module.

The processing module is configured to reduce the bit rate of the multi-person live video stream.

Specifically, in order to prevent video lagging from occurring when the live streaming members are watching the multi-person live video stream, the reduction in the bit rate of the multi-person live video stream can be performed before the multi-person live video stream is sent to the respective live streaming clients of the live streaming members, so that network resources occupied by the multi-person live video stream are reduced. The bit rate here is the number of bits transmitted per second. The higher the bit rate, the higher the speed of data transmission.

In the embodiment of the present application, the reduction in the bit rate of the multi-person live video stream is performed, so that the time consumed for sending the multi-person live video stream to the respective live streaming clients of the live streaming members can be reduced, thereby achieving a better live streaming effect.

Figure 13:
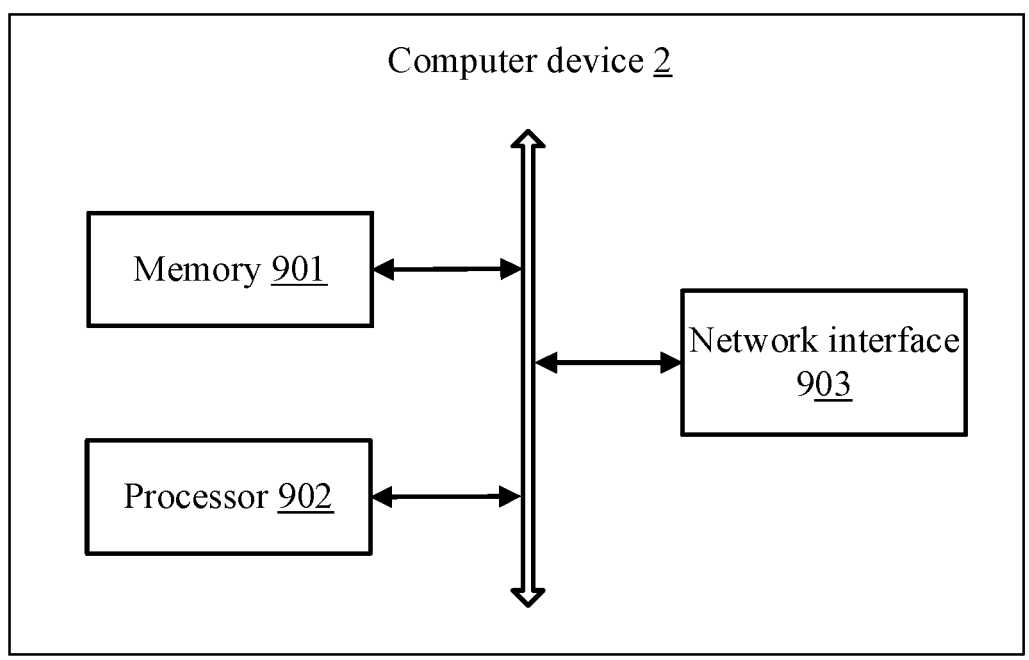
FIG. 13 is a schematic diagram of a hardware structure of a computer device that performs a method for implementing a multi-person video live streaming service and is provided according to an embodiment of the present application.

FIG. 13 schematically shows a hardware architecture of a computer device 2 applied to a method for implement a multi-person video live streaming service according to an embodiment of the present application. In this embodiment, the computer device 2 is a device that can automatically perform numerical computation and/or information processing in accordance with preset or pre-stored instructions. For example, the computer device may be a tablet computer, a notebook computer, a desktop computer, a rack server, a blade server, a tower server, a cabinet server (including an independent server, or a server cluster composed of a plurality of servers), etc. As shown in FIG. 13, the computer device 2 at least includes, but is not limited to: a memory 901, a processor 902, and a network interface 903 that can be communicatively connected to each other via a system bus. In the components:

the memory 901 includes at least one type of computer-readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 901 may be an internal storage module of the computer device 2, for example, a hard disk or a memory of the computer device 2. In some other embodiments, the memory 901 may alternatively be an external storage device of the computer device 2, for example, a plug-in hard disk disposed on the computer device 2, a smart media card (SMC for short), a secure digital (SD for short) card, a flash card, etc. Certainly, the memory 901 may alternatively include both the internal storage module of the computer device 2 and the external storage device thereof. In this embodiment, the memory 901 is generally used to store an operating system and various application software installed in the computer device 2, such as program code of the method for implementing a multi-person video live streaming service. In addition, the memory 901 may be further used to temporarily store various types of data that has been output or will be output.

The processor 902 may be, in some embodiments, a central processing unit (CPU for short), a controller, a microcontroller, a microprocessor, or other data processing chips. The processor 902 is generally used to control the overall operation of the computer device 2, for example, executing control, processing, etc. related to data exchange or communication with the computer device 2. In this embodiment, the processor 902 is used to run program code stored in the memory 901 or process data.

The network interface 903 may include a wireless network interface or a wired network interface. The network interface 903 is generally used to establish a communication connection between the computer device 2 and other computer devices. For example, the network interface 903 is used to connect the computer device 2 to an external terminal through a network, and establish a data transmission channel, a communication link, etc. between the computer device 2 and the external terminal. The network may be a wireless or wired network such as Intranet, Internet, a global system of mobile communication (GSM for short), wideband code division multiple access (WCDMA for short), a 4G network, a 5G network, Bluetooth, or Wi-Fi.

It should be noted that FIG. 13 shows only a computer device having components 901 to 903, but it should be understood that not all of the illustrated components are required to be implemented, and more or fewer components may be implemented instead.

In this embodiment, the method for implementing a multi-person video live streaming service stored in the memory 901 may also be divided into one or more program modules and executed by one or more processors (the processor 902 in this embodiment) to implement the present application.

An embodiment of the present application further provides a computer-readable storage medium having stored thereon computer-readable instructions, where upon the computer-readable instructions being executed by a processor, the following steps are implemented:

obtaining a first video and a second video of a live streamer, and obtaining a third video of other live streaming members than the live streamer in a live streaming group, where the first video includes a real-time image acquired by a first camera apparatus of the live streamer, the second video includes a video that the live streamer is watching, and the third video includes real-time images acquired by second camera apparatuses of the other live streaming members;

stitching the first video, the second video, and the third video of the other live streaming members, for obtaining a multi-person live video stream, where each frame of the multi-person live video stream includes a frame of the first video, a frame of the second video, and a frame of the third video of the other live streaming members; and sending the multi-person live video stream to respective live streaming clients of the live streaming members for the live streaming members to watch.

In this embodiment, the computer-readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the computer-readable storage medium may be an internal storage unit of the computer device, for example, a hard disk or a memory of the computer device. In some other embodiments, the computer-readable storage medium may alternatively be an external storage device of the computer device, for example, a plug-in hard disk disposed on the computer device, a smart media card (SMC for short), a secure digital (SD for short) card, and a flash card. Certainly, the computer-readable storage medium may alternatively include both the internal storage unit of the computer device and the external storage device thereof. In this embodiment, the computer-readable storage medium is generally used to store an operating system and various application software installed in the computer device, such as program code of the method for implementing a multi-person video live streaming service in the embodiments. In addition, the computer-readable storage medium may be further used to temporarily store various types of data that has been output or will be output.

The apparatus embodiments described above are merely exemplary, where units illustrated as separate components may be or may not be physically separated, and the components illustrated as units may be or may not be physical units. That is to say, the components may be positioned at one place or distributed on at least two network units. The object of the solutions in the embodiments of the present application can be achieved by selecting some or all of the modules therein according to actual needs. Those of ordinary skill in the art can understand and implement the solutions without any creative effort.

Through the descriptions of the above implementations, those of ordinary skill in the art can clearly understand that the implementations can be implemented by software and general hardware platforms. Definitely, the implementations can also be implemented by hardware. Those of ordinary skill in the art can understand that all or some of the procedures in the method of the embodiment can be implemented by computer-readable instructions instructing related hardware. The program can be stored in a computer-readable storage medium. The program, upon being executed, may include the procedures in the above method embodiments. The storage medium may be a magnetic disk, an optical disc, a read-only memory (ROM), or a random access memory (RAM).

Finally, it should be noted that the above embodiments are merely used for illustrating rather than limiting the technical solutions of the present application. Although the present application is described in detail with reference to the foregoing embodiments, those of ordinary skill in the art should understand that the technical solutions specified in the above embodiments can still be modified, or some or all of the technical features therein can be equivalently substituted; and such modifications or substitutions do not make the essence of the corresponding technical solutions depart from the scope of the technical solutions of the embodiments of the present application.

What is claimed is:

1. A method for implementing multi-person video live streaming, comprising:
    obtaining a first video and a second video of a live streamer, and obtaining a third video of any other live streaming member than the live streamer in a live streaming group, wherein the first video comprises real-time images acquired by a first image capturing device associated with the live streamer, the second video comprises a video that the live streamer is watching, and the third video comprises real-time images acquired by a second image capturing device associated with the any other live streaming member;
    stitching the first video, the second video, and the third video of the any other live streaming member, and obtaining a multi-person live video stream, wherein each frame of the multi-person live video stream comprises a frame of the first video, a frame of the second video, and a frame of the third video of the any other live streaming member, and wherein the method further comprises during the stitching, performing facial detection on the first video and the third video by using a detection thread, and in response to detecting a face, rendering an area of the detected face by using a rendering thread; and
    sending the multi-person live video stream to respective live streaming client terminals associated with members in the live streaming group for the members to watch.

2. The method of claim 1, wherein the second video is a type of dress changing video, and obtaining each frame of the multi-person live video stream comprises:
    determining whether a respective timestamp of a frame in the second video to be stitched is a preset timestamp;
    in response to determining that the respective timestamp of the frame in the second video to be stitched is the preset timestamp, performing facial detection on a frame in the first video to be stitched and a frame in the third video to be stitched;
    in response to detecting a face, adding a preset sticker special effect to the detected face to obtain a video frame to be stitched having the sticker special effect, wherein no sticker special effect is added to a video frame to be stitched when no face is detected; and
    stitching the frame in the second video to be stitched, the video frame having the sticker special effect, and the video frame having no sticker special effect, for obtaining a frame of the multi-person live video stream.

3. The method of claim 1, wherein the second video is a type of challenge video, and obtaining each frame of the multi-person live video stream comprises:
    performing expression recognition on a frame in the first video to be stitched and a frame in the third video to be stitched;
    in response to determining that a preset expression is recognized, adding a preset sticker special effect to a video frame to be stitched, wherein no sticker special effect is added to a video frame to be stitched when no preset expression is recognized; and
    stitching the frame in the second video to be stitched, the video frame to be stitched having the sticker special effect, and the video frame to be stitched having no sticker special effect, for obtaining a frame of the multi-person live video stream.

4. The method of claim 1, wherein the second video is a type of story guessing video, and obtaining each frame of the multi-person live video stream comprises:
    detecting whether a story guessing message sent by any live streaming member in the live streaming group is received;
    adding the story guessing message to a frame in the second video to be stitched in response to detecting that the story guessing message sent by any live streaming member in the live streaming group is received; and
    stitching the frame in the second video to be stitched comprising the story guessing message, a frame in the first video to be stitched, and a frame in the third video to be stitched, for obtaining a frame of the multi-person live video stream.

5. The method of claim 1, further comprising:
    distributing the multi-person live video stream to a CDN network.

6. The method of claim 1, further comprising:
reducing a bit rate of the multi-person live video stream.

7. A computer device, comprising a memory and a processor, wherein the memory stores computer-readable operable on the processor, and wherein the computer-readable instructions, upon being executed by the processor, cause the processor to implement operations comprising:
obtaining a first video and a second video of a live streamer, and obtaining a third video of any other live streaming member than the live streamer in a live streaming group, wherein the first video comprises real-time images acquired by a first image capturing device associated with the live streamer, the second video comprises a video that the live streamer is watching, and the third video comprises real-time images acquired by a second image capturing device associated with the any other live streaming member;
stitching the first video, the second video, and the third video of the any other live streaming member, and obtaining a multi-person live video stream, wherein each frame of the multi-person live video stream comprises a frame of the first video, a frame of the second video, and a frame of the third video of the any other live streaming member, and wherein the operations further comprise during the stitching, performing facial detection on the first video and the third video by using a detection thread, and in response to detecting a face, rendering an area of the detected face by using a rendering thread; and
sending the multi-person live video stream to respective live streaming client terminals associated with members in the live streaming group for the members to watch.

8. The computer device of claim 7, wherein the second video is a type of dress changing video, and the processor, upon executing the computer-readable instructions, further implements operations comprising:
determining whether a respective timestamp of a frame in the second video to be stitched is a preset timestamp;
in response to determining that the respective timestamp of the frame in the second video to be stitched is the preset timestamp, performing facial detection on a frame in the first video to be stitched and a frame in the third video to be stitched;
in response to detecting a face, adding a preset sticker special effect to the detected face to obtain a video frame to be stitched having the sticker special effect, wherein no sticker special effect is added to a video frame to be stitched when no face is detected; and
stitching the frame in the second video to be stitched, the video frame having the sticker special effect, and the video frame having no sticker special effect, for obtaining a frame of the multi-person live video stream.

9. The computer device of claim 7, wherein the second video is a type of challenge video, and the processor, upon executing the computer-readable instructions, further implements operations comprising:
performing expression recognition on a frame in the first video to be stitched and a frame in the third video to be stitched;
in response to determining that a preset expression is recognized, adding a preset sticker special effect to a video frame to be stitched, wherein no sticker special effect is added to a video frame to be stitched when no preset expression is recognized; and
stitching the frame in the second video to be stitched, the video frame to be stitched having the sticker special effect, and the video frame to be stitched having no sticker special effect, for obtaining a frame of the multi-person live video stream.

10. The computer device of claim 7, wherein the second video is a type of story guessing video, and the processor, upon executing the computer-readable instructions, further implements operations comprising:
detecting whether a story guessing message sent by any live streaming member in the live streaming group is received;
adding the story guessing message to a frame in the second video to be stitched in response to detecting that the story guessing message sent by any live streaming member in the live streaming group is received; and
stitching the frame in the second video to be stitched comprising the story guessing message, a frame in the first video to be stitched, and a frame in the third video to be stitched, for obtaining a frame of the multi-person live video stream.

11. The computer device of claim 7, wherein the processor, upon executing the computer-readable instructions, further implements operations comprising:
distributing the multi-person live video stream to a CDN network.

12. The computer device of claim 7, wherein the processor, upon executing the computer-readable instructions, further implements operations comprising:
reducing a bit rate of the multi-person live video stream.

13. A non-transitory computer-readable storage medium storing computer-readable instructions, wherein the computer-readable instructions, upon being executed by a processor, cause the processor to implement operations comprising:
obtaining a first video and a second video of a live streamer, and obtaining a third video of any other live streaming member than the live streamer in a live streaming group, wherein the first video comprises real-time images acquired by a first image capturing device associated with the live streamer, the second video comprises a video that the live streamer is watching, and the third video comprises real-time images acquired by a second image capturing device associated with the any other live streaming member;
stitching the first video, the second video, and the third video of the any other live streaming member, and obtaining a multi-person live video stream, wherein each frame of the multi-person live video stream comprises a frame of the first video, a frame of the second video, and a frame of the third video of the any other live streaming member, and wherein the operations further comprise during the stitching, performing facial detection on the first video and the third video by using a detection thread, and in response to detecting a face, rendering an area of the detected face by using a rendering thread; and
sending the multi-person live video stream to respective live streaming client terminals associated with members in the live streaming group for the members to watch.

14. The non-transitory computer-readable storage medium of claim 13, wherein the second video is a type of dress changing video, and the processor, upon executing the computer-readable instructions, further implements operations comprising:
determining whether a respective timestamp of a frame in the second video to be stitched is a preset timestamp;

in response to determining that the respective timestamp of the frame in the second video to be stitched is the preset timestamp, performing facial detection on a frame in the first video to be stitched and a frame in the third video to be stitched;

in response to detecting a face, adding a preset sticker special effect to the detected face to obtain a video frame to be stitched having the sticker special effect, wherein no sticker special effect is added to a video frame to be stitched when no face is detected; and stitching the frame in the second video to be stitched, the video frame having the sticker special effect, and the video frame having no sticker special effect, for obtaining a frame of the multi-person live video stream.

15. The non-transitory computer-readable storage medium of claim 13, wherein the second video is a type of challenge video, and the processor, upon executing the computer-readable instructions, further implements operations comprising:

performing expression recognition on a frame in the first video to be stitched and a frame in the third video to be stitched;

in response to determining that a preset expression is recognized, adding a preset sticker special effect to a video frame to be stitched, wherein no sticker special effect is added to a video frame to be stitched when no preset expression is recognized; and stitching the frame in the second video to be stitched, the video frame to be stitched having the sticker special effect, and the video frame to be stitched having no sticker special effect, for obtaining a frame of the multi-person live video stream.

16. The non-transitory computer-readable storage medium of claim 15, wherein the second video is a type of story guessing video, and the processor, upon executing the computer-readable instructions, further implements operations comprising:

detecting whether a story guessing message sent by any live streaming member in the live streaming group is received;

adding the story guessing message to a frame in the second video to be stitched in response to detecting that the story guessing message sent by any live streaming member in the live streaming group is received; and stitching the frame in the second video to be stitched comprising the story guessing message, a frame in the first video to be stitched, and a frame in the third video to be stitched, for obtaining a frame of the multi-person live video stream.

17. The non-transitory computer-readable storage medium of claim 15, wherein the processor, upon executing the computer-readable instructions, further implements operations comprising:

distributing the multi-person live video stream to a CDN network.

18. The non-transitory computer-readable storage medium of claim 15, wherein the processor, upon executing the computer-readable instructions, further implements operations comprising:

reducing a bit rate of the multi-person live video stream.

* * * * *